(12) United States Patent
Usami

(10) Patent No.: US 6,467,182 B2
(45) Date of Patent: Oct. 22, 2002

(54) TAPE MEASURE WITH BRAKING SYSTEM AND MOVABLE DRUM

(75) Inventor: Tsutomu Usami, Moriyama (JP)

(73) Assignee: KDS Corporation (JP)

( * ) Notice: Subject to any disclaimer, the term of this patent is extended or adjusted under 35 U.S.C. 154(b) by 0 days.

(21) Appl. No.: 09/903,184

(22) Filed: Jul. 11, 2001

(65) Prior Publication Data

US 2002/0004993 A1 Jan. 17, 2002

(30) Foreign Application Priority Data

Jul. 17, 2000 (JP) ........................................ 2000-221067

(51) Int. Cl.$^7$ ................................................. G01B 3/10
(52) U.S. Cl. ...................................... 33/767; 242/381.6
(58) Field of Search ........................... 33/767, 755, 761, 33/769; 242/385, 385.4, 385.2, 396, 396.1, 396.2, 396.5, 396.6, 376, 378.1

(56) References Cited

U.S. PATENT DOCUMENTS 4,856,726 A * 8/1989 Kang ........................ 242/84.8
5,624,085 A * 4/1997 Usami ........................ 242/381
5,794,357 A * 8/1998 Gilliam et al. ................ 33/767
6,032,896 A * 3/2000 Liu ........................ 242/381.6

FOREIGN PATENT DOCUMENTS

| JP | 08-005301 | | 1/1996 |
| JP | 408005302 A | * | 1/1996 |
| JP | 779 496 A1 | * | 6/1997 |
| JP | 11-194002 | | 7/1999 |

* cited by examiner

Primary Examiner—Diego Gutierrez
Assistant Examiner—Tania Courson
(74) Attorney, Agent, or Firm—John R. Benefiel

(57) ABSTRACT

A tape measure (50, 60) includes a take-up drum (51) around whose circumference a measuring tape (6) is wound, and a take-up spring (5) for supplying impetus to cause the take-up drum (51) to rotate in the direction of retracting the measuring tape (6). The measure further includes an operation member (100, 200) installed on the case (1, 2) for moving the take-up drum (51) in the radial direction of supporting shafts (1a, 2a) disposed inside the case. The measure still further includes braking members (1c, 2c) disposed on the inside walls of the case (1, 2) to apply braking force to the rotation of the take-up drum (51) by the contact between the take-up drum and the braking members when the take-up drum (51) is moved by the operation member (100, 200).

33 Claims, 6 Drawing Sheets

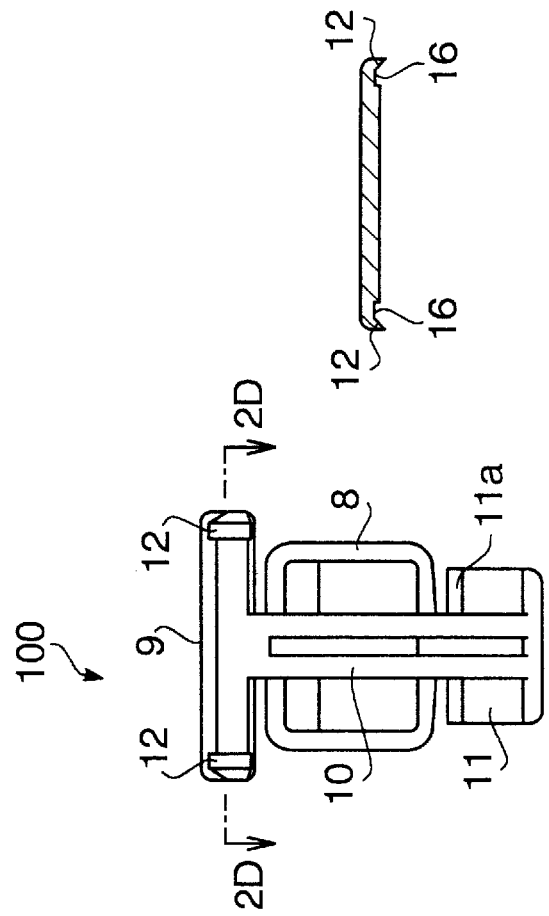
FIG.2D
FIG.2C
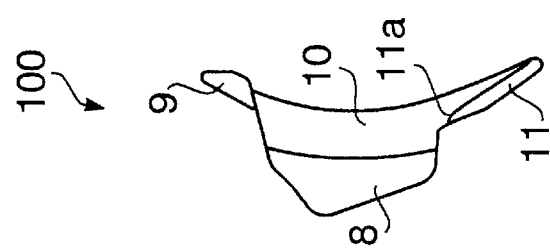
FIG.2B
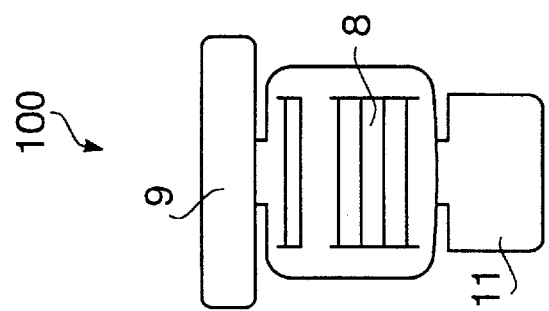
FIG.2A

TAPE MEASURE WITH BRAKING SYSTEM AND MOVABLE DRUM

CROSS REFERENCES TO RELATED APPLICATION

This application claims priority under 35 USC 119 of Japanese Patent Application No. 2000-221067 filed in JPO on Jul. 17, 2000, the entire disclosure of which is incorporated herein by reference.

BACKGROUND OF THE INVENTION

1. Field of the Invention

The present invention relates to a tape measure in which a flexible measuring tape is accommodated inside a case.

2. Description of the Related Art

Tape measures in which a flexible measuring tape is accommodated inside a case have structure in which the flexible measuring tape is accommodated by being wound around the circumference of a take-up drum which is supported inside the case such that this take-up drum is free to rotate. A take-up spring is installed on this take-up drum, and when the measuring tape is pulled out, a spring force is accumulated in the direction in which the measuring tape is retracted. Accordingly, when the hand is released from the measuring tape that has been pulled out, the measuring tape is automatically retracted into the case by the spring force of the take-up spring.

In order to ensure that the measuring tape is completely taken up inside the case, a strong spring that can overcome the frictional force that occurs during take-up is used as the take-up spring. Accordingly, when the measuring tape is rewound after being pulled out a long distance (e. g., approximately 3 m), the take-up speed of the measuring tape increases, so that rebound of the measuring tape occurs, thus leading to the possibility of damage to the measuring tape, or the possibility that the rebounding measuring tape will strike fingers of a user during use.

The tape measure disclosed in Japanese Patent Application Laid-Open Publication No. 8-5301 is a tape measure which suppresses the rise of the rotation speed of the take-up drum, gains large breaking force when the case is turned in a certain direction, and solves such problems.

However, since the braking force of the tape measure depends on the direction, there has been a problem that sufficient force cannot be obtained in a certain condition in which the tape measure is used.

Furthermore, there has been another problem that the measuring tape is inadvertently retracted into the case, when measuring is carried out with the measuring tape kept outside the case.

SUMMARY OF THE INVENTION

It is an object of the present invention to provide a tape measure which solves the above problems, and can gain large braking force regardless of the direction of the case.

It is another object of the present invention to provide a tape measure which can prevent inadvertent retraction of the pulled-out measuring tape.

It is still another object of the present invention to provide a tape measure which can suppress the rise in the rotational speed of the take-up drum by a simple mechanism.

According to one aspect of the present invention, there is provided a tape measure which comprises: a take-up drum which is supported by a supporting shafts disposed inside a case such that this take-up drum is free to rotate, and around whose circumference a measuring tape is wound; a take-up spring which urges the take-up drum to move in the retraction direction of the measuring tape; bearings which are formed on the take-up drum, have inner diameters that are larger than the outer diameters of the supporting shafts, and enable the take-up drum to move in the radial direction of the supporting shafts; an operation member which is installed on the case, and moves the take-up drum in the radial direction of the supporting shafts so as to move in one direction of the inside wall of the case; and braking member which is disposed on the inside walls of the case, and applies braking force to the rotation of the take-up drum by making contact with the outer circumference of the take-up drum when the take-up drum is moved by the operation member.

As a result, braking force can be applied by moving the take-up drum in the radial direction of the supporting shafts by means of the operation member so as to make the take-up drum contact with the braking member. Thereby, a sufficient braking force can be obtained regardless of the direction of the case. Furthermore, since the speed of taking up the measuring tape can be suppressed, it is possible to prevent, for example, the damage of the measuring tape caused by abrupt take-up. Moreover, since the take-up drum is caught between the operation member and braking members, sufficient braking force can be obtained by applying small force.

The front surfaces of the braking members may have curved surfaces that generally conform to the outer circumferential form of the take-up drum. In this manner, the contact area between the take-up drum and the braking member can be increased, so that a larger braking force can be obtained.

The operation member may further comprise: a knob member which is located on the side wall of the case (this side wall demarcates the outer circumferential parts of the take-up drum) such that this knob member is free to move to and from the inside of the case; and a brake shoe which is disposed on the knob member and inside the case, and contacts with the outer circumferential parts of the take-up drum so as to cause the take-up drum to move toward the opposite side of the operation member, and also gives braking force to the rotation of the take-up drum. In the tape measure having these elements, it is possible to apply still larger braking force to the take-up drum, because the brake shoe itself also can apply braking force in addition to the braking force applied by pushing the knob member toward the inside of the case so as to make the take-up drum contact with the braking member.

The cross-sectional shape of the supporting shafts may also be a non-circular shape. By making the supporting shafts have such a shape, it is possible to restrict the range within which the take-up drum can move in the radial direction of the supporting shafts, so that the take-up drum does not unnecessarily contact with the inside wall of the case.

According to another aspect of the present invention, there is provided a tape measure comprising: a take-up drum which is supported by supporting shafts disposed inside a case such that this take-up drum is free to rotate, and around whose circumference a measuring tape is wound; a take-up spring which provides impetus causing the take-up drum to rotate in the retraction direction of the measuring tape; bearings which are formed on the take-up drum, have inner diameters larger than the outer diameters of the supporting shafts, and enable the take-up drum to move in the radial direction of the supporting shafts; an operation member which is installed on the case, causes the take-up drum to move in the radial direction of the supporting shafts, and thereby forces the take-up drum to move in one direction of the inside wall of the case; braking members which are disposed on the inside wall of the case, and apply braking force to the rotation of the take-up drum by the contact between the braking members and the outer circumferential parts of the take-up drum when the take-up drum is moved by the operation member; and tape lock means which are disposed in the operation member for fixing the measuring tape in an appropriate place by applying braking force to the measuring tape pulled out of said take-up drum to the outside of said case against the impetus by the take-up spring so as to maintain the length of the pulled-out measuring tape.

As a result, braking force can be applied by moving the take-up drum in the radial direction of the supporting shafts by means of the operation member so that the take-up drum is caused to contact with the braking members. Accordingly, sufficient braking force can be applied without depending on the direction of the case. Furthermore, since the take-up speed of the measuring tape can be suppressed, it is possible to prevent, for example, the damage of the measuring tape caused by abrupt take-up. Moreover, since the take-up drum is caught between the operation member and braking members, it is possible to obtain sufficient braking force by applying a small force. In addition, the measuring tape is not inadvertently retracted during measurement, because the measuring tape can be held in a state in which the measuring tape is pulled out by the measuring tape lock means, so that there is no inadvertent retraction of the measuring tape during measurement. Moreover, the efficiency in measuring is good, because it is possible to hold the measuring tape with arbitrary length of the pulled-out measuring tape.

The measuring tape lock means may include a braking piece which fixes the measuring tape pulled out of the take-up by applying braking force applied by the contact between this lock means and the measuring tape, and hold means for holding the braking piece in a place where the measuring tape should be fixed. In this manner, the hold means enables the braking piece to be held with the measuring tape fixed.

The operation member may include: a knob member which is located on the side wall of said case that demarcates the outer circumferential parts of said take-up drum such that this knob member is free to perform a reciprocating motion to and from the inside of the case; a brake shoe which is located inside said case, contacts with the outer circumferential parts of said take-up drum so as to move said take-up drum toward the opposite side of said operation member, and applies braking force to the rotation of said take-up drum; a braking piece which contacts with one side surface of said pulled-out measuring tape, and thereby applies braking force when said knob member is made to move, along the outer circumferential parts of said take-up drum, toward an opening out for pulling out the measuring tape; and hold means for holding said knob member in the place where said knob member is located, when said braking piece contacts with the one side surface of said measuring tape and thereby applies braking force. By using this operation member having these elements, it is possible to apply braking force to the take-up drum by pushing the knob member toward the inside of the case, and possible to hold the measuring tape with arbitrary length of the pulled-out measuring tape by moving the knob member, along the outer circumference of the take-up drum, toward the opening for the measuring tape.

BRIEF DESCRIPTION OF THE DRAWINGS

FIG. 2A is a front view of an operation member 100 in FIG. 1A;

FIG. 2B is a right-side view of the operation member 100 in FIG. 2A;

FIG. 2C is a back view of the operation member 100 in FIG. 2A;

FIG. 2D is a sectional view taken along the line 2D—2D in FIG. 2C;

DETAILED DESCRIPTION OF THE INVENTION

Following is a description of preferred embodiments of the present invention with reference to the drawings.

Figures 1A, 1B, 1C:
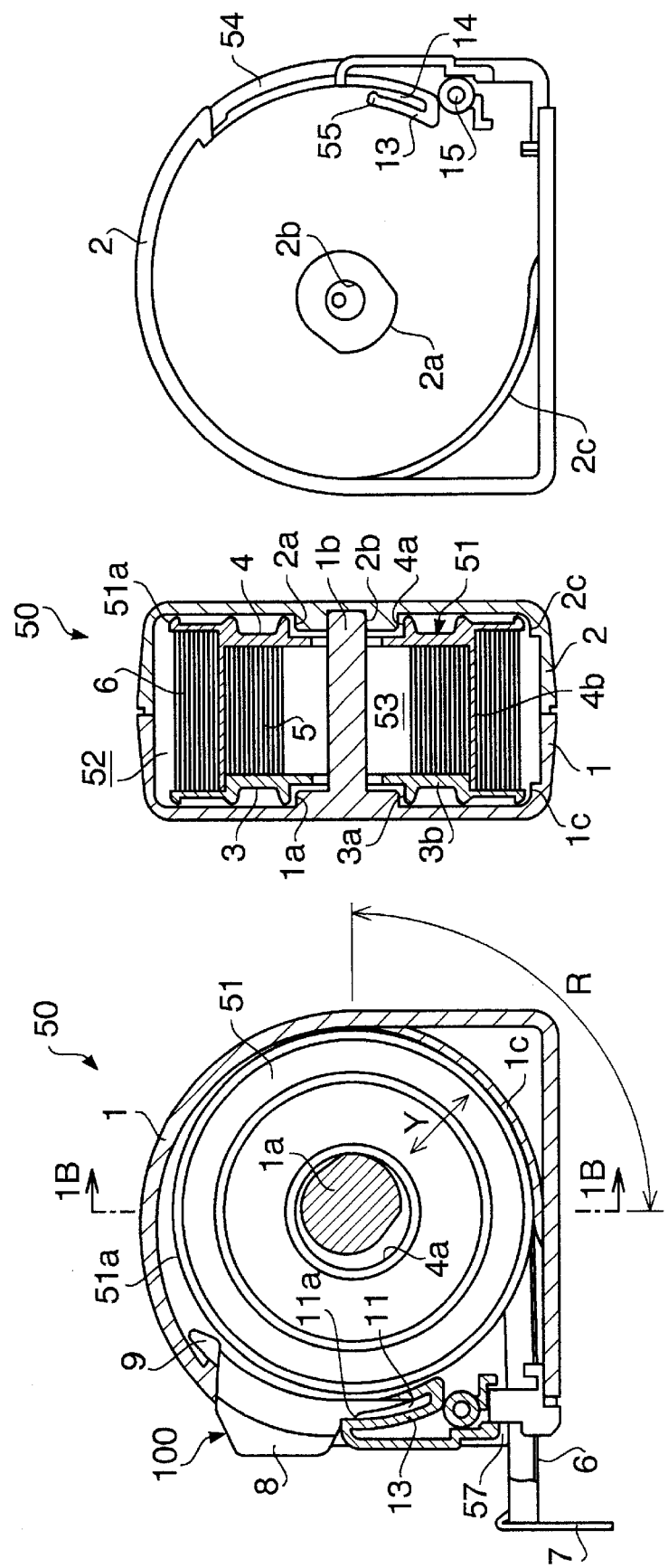
FIG. 1A is a sectional view illustrating the internal structure of a tape measure held horizontally according to an embodiment of the present invention.
FIG. 1B is a sectional view taken along the line 1B—1B in FIG. 1A.
FIG. 1C is a plan view of the upper case of the tape measure shown in FIG. 1A.

As shown in FIG. 1A, 1B and 1C, the tape measure 50 comprises; a take-up drum 51 which is supported by supporting shafts 1a and 2a disposed in a case 1, 2 such that the take-up drum 51 is free to rotate; a flexible measuring tape 6 which is wound around the take-up drum 51, and thereby accommodated inside the case 1, 2; and a coil-form take-up spring 5 which supplies impetus causing the take-up drum 51 to rotate in the retraction direction of the measuring tape 6.

The case has two-part split structure comprising a lower case 1 and an upper case 2. The lower case 1 and the upper case 2 are engaged at step parts located on the circumferential edges thereof, and thereby are joined into an integral unit. An installation shaft 1b is provided at the center of the lower case. This installation shaft passes through the take-up drum 51, and extends toward an installation hole 2b at the center of the upper case 2. The lower case 1 and the upper case 2 are joined into an integral unit by means of a fixing screw (not shown in the drawings.) which is inserted into the installation shaft 1b from the outside of the upper case 2. Furthermore, supporting shafts 1a and 2a are disposed at the center part of the lower case 1 and the upper case 2 respectively, and support the take-up drum 51 such that the take-up drum 51 is free to rotate. In addition to that, braking members 1c and 2c which will be described hereinbelow are disposed on the inside walls of the lower case 1 and the upper case 2 respectively.

Additionally, in the present embodiment, the material of the lower case 1 and the upper case 2 is ABS resin, and the installation shaft 1b, the supporting shafts 1a and 2a and the braking members 1c and 2c are integrally formed on the cases.

The take-up drum 51 has two-part split structure comprising a take-up drum cover part 3 and a take-up drum main part 4. A tubular part 4b formed on the inside of the take-up drum main part 4 integrally joined with a thick part 3b formed on the inside of the take-up drum cover part 3. A take-up part 52 for the measuring tape 6 is formed on the outside of the tubular part 4b, and an accommodation part 53 for the take-up spring 5 is formed on the inside of the tubular part 4b.

Circular bearings 3a and 4a are formed on the outside walls of the take-up drum cover part 3 and take-up drum main part 4 respectively, and the take-up drum 51 is supported by the supporting shafts 1a and 2a of the cases 1 and 2 via the bearings 3a and 4a such that the take-up drum is free to rotate. As shown in FIGS. 1A and 1C, the supporting shafts 1a and 2a of the cases 1 and 2 have substantially elliptical shapes, and both sides of the elliptical shapes are formed with circular-arc shapes. The bearings 3a and 4a of the take-up drum 51 have inner diameters greater than the outer diameters of the supporting shafts 1a and 2a. Accordingly, the take-up drum 51 can move in the radial direction of the supporting shafts 1a and 2a.

In this embodiment, it is possible to restrict the direction in which the take-up drum can move, as a result of the fact that the supporting shafts 1a and 2a are formed in a non-circular shape as described above. That is, the take-up drum 51 is constituted such that the take-up drum can move, only in the range indicated by the arrow R in FIG. 1A (i. e., in the range in which the braking members 1c and 2c are disposed), in the radial direction of the supporting shafts 1a and 2a (i. e., in the direction indicated by the arrow Y in FIG. 1A). When the take-up drum 51 moves, outward, in the radial direction of the supporting shafts 1a and 2a, and in the range indicated by the arrow R, the outer circumferential parts 51a of the take-up drum 51 contact with the braking members 1c and 2c with a large contact area along the circumference of the take-up drum 51. Moreover, the take-up drum 51 is constituted such that the take-up drum cannot move, outside the range indicated by the arrow R, in the in the radial direction of the supporting shafts 1a and 2a, so that the take-up drum 51 does not contact the inside walls of the cases 1 and 2 in this area. In the present embodiment, however, it is apparent that there is no limitation on shapes of the supporting shafts 1a and 2a, and the supporting shafts may have other shapes such as a circular shape as long as the constitution is such that the take-up drum 51 can reciprocate relative to the braking members 1c and 2c.

A measuring tape 6 is accommodated by being wound around the take-up part 52 of the take-up drum 51. The inside end part of the measuring tape 6 is fixed on the take-up drum 51. Furthermore, the outside end part of the measuring tape 6 is pulled, toward the outside of the case 1, 2, out of an opening 57 for the measuring tape, and is not pulled into the case 1, 2 by a hook member 7 disposed on the outside end. This hook member 7 can also be hooked by an object of measuring when measuring is carried out.

A take-up spring 5 is accommodated in the accommodation part 53 of the take-up drum 51. The inside end part of the take-up spring 5 is fixed on the installation shaft 1b of the lower case 1, and the outside end part of the take-up drum 5 is fixed on the take-up drum main part 51. When the measuring tape is pulled out of the case 1, 2, the take-up spring 5 supplies impetus which causes the take-up drum 51 to rotate in the direction of retracting the measuring tape 6 into the case 1, 2.

Moreover, braking members 1c and 2c are formed on the inside walls of the cases 1, 2 so that the braking members contact with the outer circumference of the take-up drum when the take-up drum moves in the radial direction of the supporting shafts 1a and 2a, and thereby apply braking force to the rotation of the take-up drum 51. As shown in FIGS. 1A and 1C, the braking members 1c and 2c have curved surfaces that generally conform to the outer circumferential parts 51a of the take-up drum 51. Furthermore, the end parts of flange parts which form the outer circumferential parts 5 1a of the take-up drum 51 are formed with a tapered cross-sectional shape as shown in FIG. 1B. Moreover, the cross-sectional shapes of the braking members 1c and 2c are similarly tapered. These shapes lead to the increased contact area between the outer circumferential parts 51a of the take-up drum 51 and the braking members 1c and 2c, so that the braking effect can be heightened. Additionally, the frictional force may be heightened by, for example, applying crimping to one or both of the contact surfaces of the outer circumferential parts 51a of the take-up drum 51 and the braking members 1c and 2c.

Furthermore, an operation member 100 is provided near (in FIG. 1A, above) the opening 57 for the measuring tape 6 which is situated on the side wall of the case 1, 2 that demarcates the outer circumferential parts 51a of the take-up drum 51. An installation opening part 54 for installing the operation member 100 is formed in the side wall of the case 1, 2, and is relatively close to the opening 57 for the measuring tape 6. The operation member 100 is used for applying braking force. That is, a worker or an operator pushes the operation member, and thereby the take-up drum 51 moves in the radial direction of the supporting shafts 1a and 2a. As a result, the take-up drum is pushed against braking members 1c and 2c, and braking force is applied.

The operation member 100 will be described with reference to FIGS. 2A through 2C.

The operation member 100 is constituted as an integral unit from a material that possesses flexibility, for example, synthetic resin such as polyacetal and so on. As shown in FIG. 2B, the operation member 100 is formed with a curved shape that substantially conforms to the outer circumference of the take-up drum 51.

A knob member 8 is disposed in the center of the operation member 100, and protrudes to the outside of the case 1,2 from the installation opening part 54 formed on the case 1, 2, when the operation member 100 is installed on the case 1, 2.

A brake shoe 9 is disposed on the upper part of the operation member 100, and is positioned inside the case 1, 2. The brake shoe 9 contacts with the outer circumferential parts 51a of the take-up drum 51, moves the take-up drum 51 toward the opposite side of the operation member, and also applies braking force to the rotation of the take-up drum 51. As shown in FIG. 2D, projecting parts 12 are formed on both ends of the brake shoe 9, and concave parts 16 are formed at the inside of the respective projecting parts 12 such that the interval between the concave parts is equal to the width of the take-up drum 51. When the knob member 8 is pressed so that the operation member 100 is pressed to the inside of the case 1, 2, the concave parts 16 contact with the outer circumferential parts 51a of the take-up drum 51. That is, the concave parts 16 of the brake shoe 9 respectively contact with the flange parts that form the outer circumferential parts 51a of the take-up drum 51.

Furthermore, a guide part 10 is formed in the center of the operation member 100, and guides the movement of the brake shoe 9, when the knob member 8 is pressed into the case 1, 2. A flange part 11 is formed on the lower part of the operation member 100, and is used for installing the operation member 100 in the case 1, 2.

As shown in FIG. 1A and 1C, the flange part 11 on the lower part of the operation member 100 is inserted into a ditch 14 formed by a flange guide part 13 provided in the case 1, 2, and thereby the operation member 100 is installed at the installation opening part 54 of the side wall of the case 1, 2. In addition to that, since inside the case 1, 2, the brake shoe 9 disposed on the upper part of the operation member 100 engages the edge of the installation opening part 54, the operation member 100 is prevented from slipping out of the case 1, 2. The knob member 8 is positioned such that the knob member protrudes to the outside of the case 1, 2 from the opening part 54, and thus a worker can press the knob member from the outside of the case 1, 2.

A projecting part 55 is formed on the upper end of the flange guide part 13. The flange part 11 of the operation member 100 is inserted into the ditch 14 such that this projecting part 55 engages the flange part 11. When the knob member 8 of the operation member 100 is pressed toward the inside of the case 1, 2, the contact point between the flange part 11 and the projecting part 55 serves as a supporting point, and thereby the operation member 100 flexes into the case 1, 2. The brake shoe 9, thereby, contacts with the take-up drum 51,and moreover the take-up drum 51 is pressed against the braking members 1c and 2c.

Additionally, reference number 15 designates a screw hole used for fixing the cases 1 and 2.

Next, the operation of the present embodiment will be described.

With reference to FIGS. 1A, 1B and 1C, first description concerns the tape measure 50 of this embodiment which is held in a state in which the pull-out opening 57 is positioned in the horizontal direction or in the upward direction of gravity.

FIGS. 1A, 1B and 1C shows only a state in which the pulled-out opening 57 of the tape measure 50 is held in the horizontal direction. However, whether the pulled-out opening 57 is held in the horizontal direction or in the upward direction of gravity, the take-up drum 51 is positioned at the lower part of the case due to its own weight, and the outer circumferential parts 51a of the take-up drum 51 contact with the braking members 1c and 2c. When the measuring tape 6 is pulled out of the pulled-out opening 57 by the length required for measurement, force is accumulated in the coil-form take-up spring 5 inside the take-up drum 51. When the hand is released from the measuring tape 6 after finishing measurement, the measuring tape 6 is automatically taken up into the case 1, 2 by the accumulated force of the take-up spring 5.

At this time, the outer circumferential parts of the take-up drum 51 contact with the braking members 1c and 2c, frictional force acts between the outer circumferential parts 51a of the take-up drum 51 and the braking members 1c and 2c, so that the rotational speed of the take-up drum 51 can be suppressed.

However, when the length of the pulled-out measuring tape is longer, the accumulated force of the take-up spring 5 becomes larger. In addition to that, the weight of the take-up drum 51 itself is small, and consequently there is a possibility that sufficient braking force cannot be obtained at the beginning of the take-up.

Accordingly, when it is desired to slow the rotation speed of the take-up drum 51, a worker presses the knob member 8 of the operation member 100 into the inside of the case 1, 2. Pushing the knob member 8 causes the operation member 100 to flex toward the take-up drum 51 with contact part between the flange part 11 and projecting part 55 as a supporting point, so that the concave parts 16 of the brake shoe 9 contact with the outer circumferential parts 51a of the take-up drum 51. The concave parts 16 that contact with the take-up drum 51 move the take-up drum 51, and press the take-up drum 51 against the braking members 1c and 2c positioned on the opposite side. As a result, frictional force acts between the take-up drum 51 and the braking members 1c and 2c, and between the take-up drum 51 and the concave parts 16, so that the rotation speed of the take-up drum 51 can be further suppressed.

It is possible to set the rotational speed of the take-up drum 51 (i. e., the take-up speed of the measuring tape 6) at a desired speed by adjusting the force of pressing the knob member 8. Furthermore, by pressing the knob member 8 more strongly, it is possible to firmly catch the take-up drum 51 between the brake shoe 9 of the operation member 100 and the braking members 1c and 2c of the case 1, 2 so that the rotation of the take-up drum 51 is stopped, and thus possible to temporarily stop the take-up of the measuring tape 6.

Figure 3B:
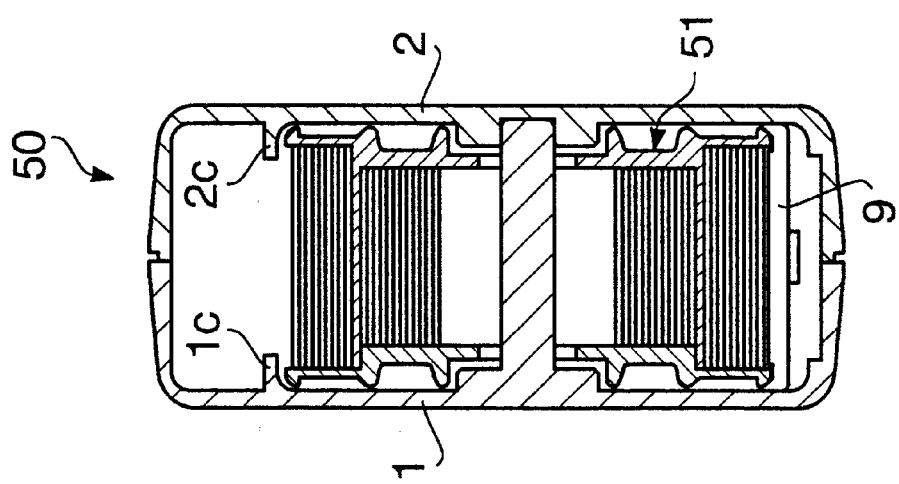
FIG. 3B is a sectional view taken along the line 3B—3B in FIG. 3A.
Figure 3A:
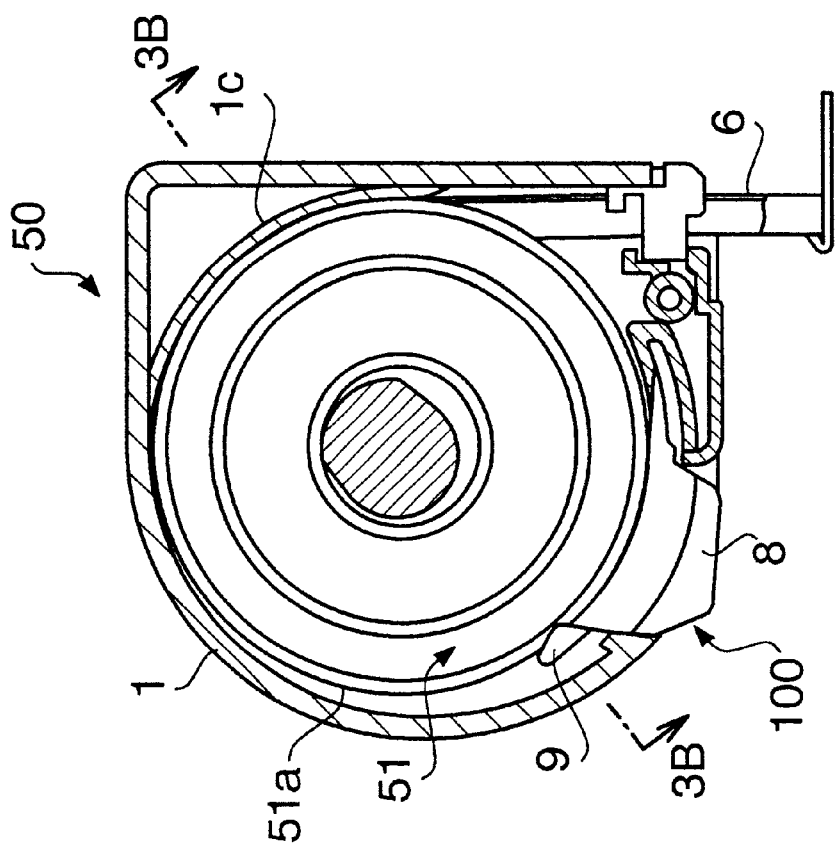
FIG. 3A is a sectional view illustrating the internal structure of the tape measured shown in FIG. 1A which is held such that the measuring tape is taken up from below.

With reference to FIGS. 3A and 3B, second description concerns the tape measure 50 which is held in a state in which the measuring tape 6 is take up from the downward direction of gravity.

In this state (that is, the tape measure 50 is held with the pulled-out opening 57 facing in the downward direction of gravity), the take-up drum 51 is caused to move toward the pulled-out opening 57 and toward the operation member 100 by its own weight, so that the braking members 1c and 2c and the outer circumferential parts 51a of the take-up drum 51 are separated, and do not contact with each other. Accordingly, when a hand of a worker is released from the pulled-out measuring tape 6 so as to start take-up of the measuring tape 6, the take-up drum 51 dances upward and downward as the rotational speed of the take-up drum 51 increases, so that the outer circumferential parts 51a of the take-up drum 51 intermittently contact with the braking members 1c and 2c, thus causing braking force to be applied to the take-up drum 51.

However, when this braking force is insufficient, the knob member 8 is pressed into the inside of the case 1, 2 as shown in FIGS. 3A and 3B. When the knob member 8 is pressed, the concave parts 16 contact with the take-up drum 51 in the same manner as described above, so that the take-up drum 51 is pressed against the braking members 1c and 2c, thus making it possible to cause sufficient deceleration of the rotational speed of the take-up drum 51. Moreover, if the knob member 8 is held in a firmly pressed state, the measuring tape 6 can be stopped and held as described above.

Thus, according to the tape measure 50 of the this embodiment, large braking force can be applied to the measuring tape 6 by pressing the operation member 100, regardless of the direction of the case.

Since the take-up speed of the measuring tape can be sufficiently restrained, rebounding motion of the measuring tape 6 can be securely prevented, so that, for example, damage to the tape can be prevented.

Since the braking members 1c and 2c and the brake shoe 9 of the operation member 100 contact with the take-up drum 51 so as to catch (sandwich) the take-up drum 51 between these parts, a large braking force can be obtained by applying small pressing force.

Furthermore, since the take-up drum 51 moves, the movable distance (pressing distance) is relatively long when the operation member 100 is pressed, so that a worker can easily obtain a sense of operation, and it is easy to operate the tape measure.

Next, another embodiment of the present invention will be described with reference to FIGS. 4A to 4C, 5A to 5C, and 6.

The basic structure of the tape measure 60 of this embodiment is similar to the structure of the tap measure 50 of the embodiment shown in FIGS. 1A to 1C. Similar or same parts are marked with the same reference number, and a description of these parts is omitted.

In addition to the mechanism which applies braking force to the take-up drum 51 as in the embodiment described hereinabove, the tape measure 60 of this embodiment has a mechanism which fixes the measuring tape 6 by applying braking force to the measuring tape 6, and thus maintains the length of the pulled-out measuring tape 6.

Figure 4C:
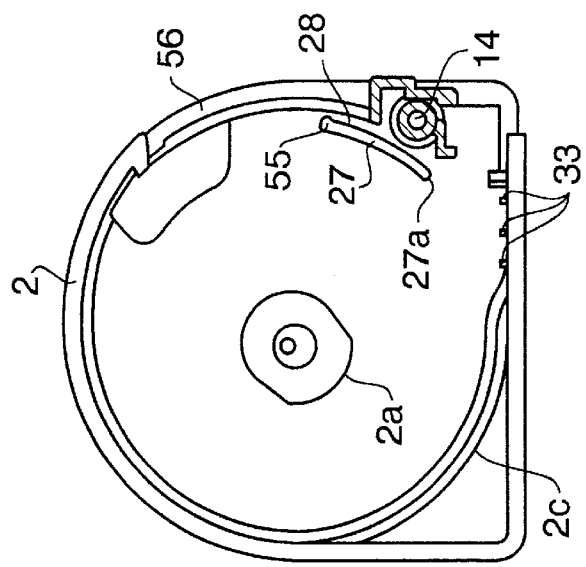
FIG. 4C is a plan view of the upper case of the tape measure shown in FIG. 4A.
Figure 4B:
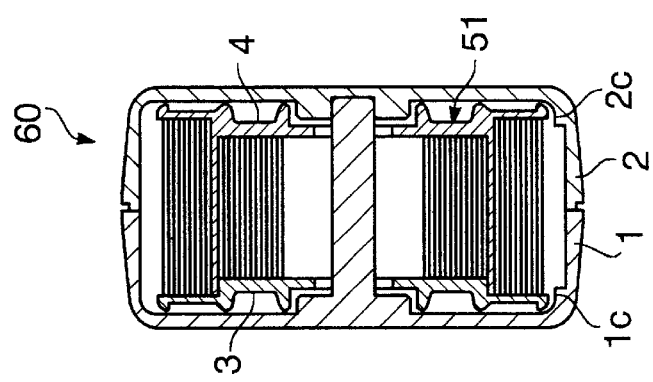
FIG. 4B is a sectional view taken along the line 4B—4B in FIG. 4A.
Figure 4A:
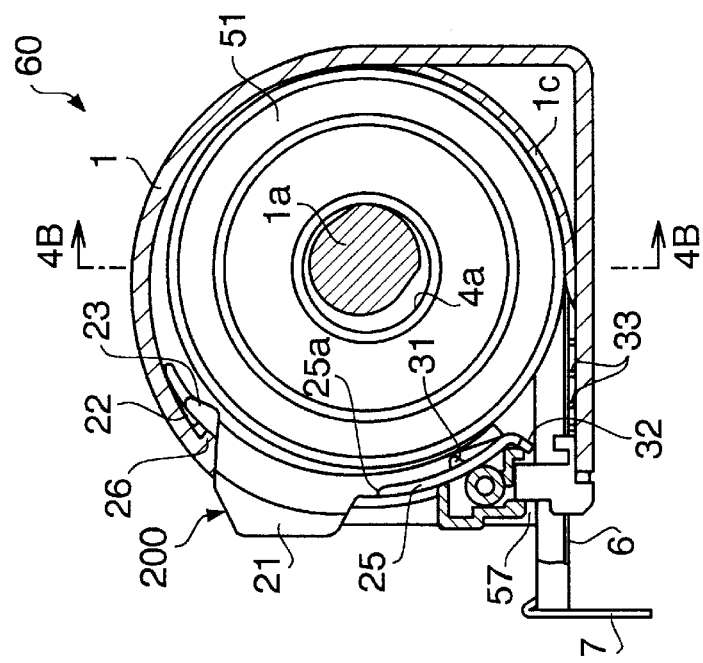
FIG. 4A is a sectional view illustrating the internal structure of a tape measure held horizontally according to another embodiment of the present invention.

That is, the operation member 200 is installed such that the operation member can be pressed into the inside of the case 1, 2, and can also move upward and downward along the side wall of the case 1, 2 in FIG. 4A. When the operation member 200 is pressed, braking force can be applied to the take-up drum 51, and when the operation member 200 is made to move downward along the side wall of the case 1, 2, the measuring tape 6 can be fixed.

Figure 5C:
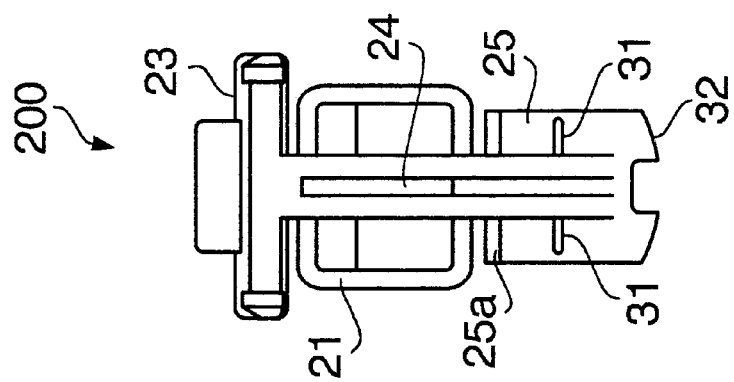
FIG. 5C is a back view of the operation member shown in FIG. 4A.

The operation member 200 will be described with reference to FIGS. 5A to 5C.

Figure 5B:
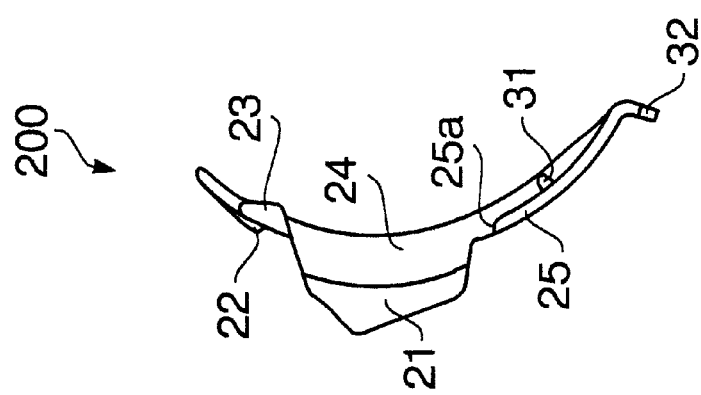
FIG. 5B is a right-side view of the operation member shown in FIG. 5A.
Figure 5A:
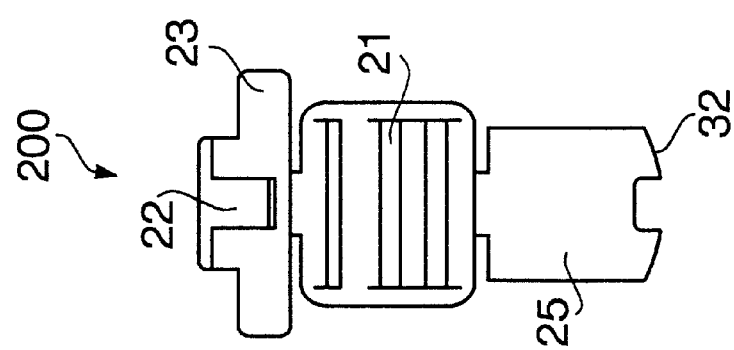
FIG. 5A is a front view of an operation member 200 shown in FIG. 4A.
Figure 6:
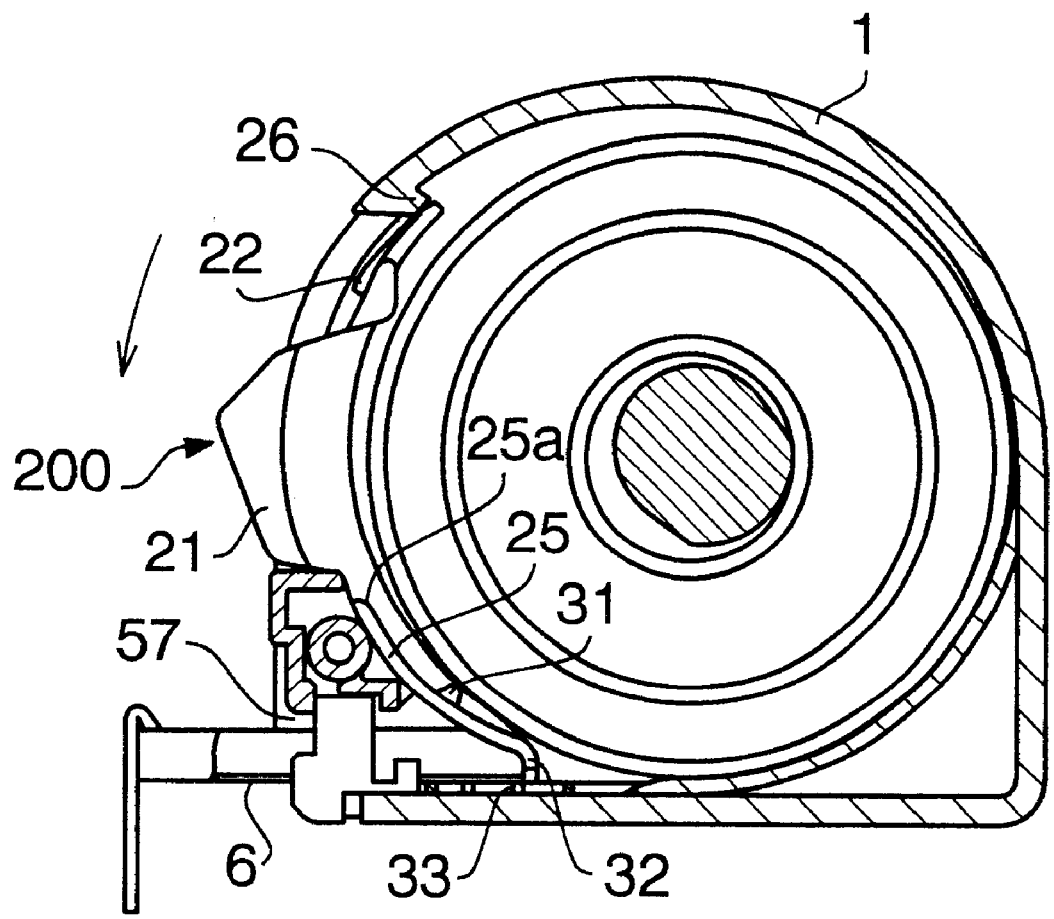
FIG. 6 is a drawing similar to FIG. 5A showing the locked state of the measuring tape 6.

As shown in FIG. 5B, the operation member 200 is formed with a curved shape that generally conforms to the outer circumferential parts of the take-up drum 51, and is integrally molded from a material that possesses flexibility, for example, synthetic resin material such as polyacetal, etc.

A knob member 21 is formed in the center of the operation member 200, and a brake shoe 23 is provided on the upper part of the operation member 200. This brake shoe 23 contacts with the outer circumferential parts 5 1a of the take-up drum 51, moves the take-up drum 51 toward the opposite side of the operation member so that the take-up drum 51 is pressed against the braking members 1c and 2c. Thereby, braking force is applied to the rotation of the take-up drum 51. The knob member 21 and the brake shoe 23 are formed with the same shapes as the knob member and brake shoe of the embodiment shown in FIGS. 2A to 2C.

An engaged part 22 is formed on the back side of the brake shoe 23. The engaged part 22 is engaged by an engaging part 26 disposed inside the case 1, 2. Furthermore, a guide part 24 is formed on the back side of the knob member 21, and guides the movement of the brake shoe 23 when the knob member 21 is pressed into the inside of the case 1, 2. In addition, a flange part 25 is formed under the knob member 21, and is used for installing the operation member 200 in the case 1, 2.

A braking piece 32 which is measuring tape lock means for fixing the measuring tape 6 that has been pulled out of the case 1, 2, and engagement parts 31 which are hold means for holding the braking piece 32 in a place where the measuring tape 6 is fixed, are disposed under the knob member 21 (i.e., on the lower part of the operation member 200). As shown in FIG. 5B, the end part of the braking piece 32 is curved in the opposite direction of the curvature of the operation member 200, and has a substantially L-shaped form. When the operation member 200 is made to move downward along the side walls of the case 1, 2 (i. e., toward the pulled-out opening 57), the braking piece 32 contacts with one side surface of the measuring tape 6, and applies braking force, so that the measuring tape 6 is fixed.

The engagement parts 31 are disposed on the inside part of the flange part 25 (i. e., on the side facing the take-up drum 51), and have projections that extend in the direction of the width of the flange part 25.

As shown in FIGS. 4A and 4B, the operation member 200 is installed at the opening part 56 formed in the side wall of the case 1, 2 by inserting the flange part 25 and engagement parts 31 into a ditch 25 formed by flange guide parts 27 disposed on both cases 1 and 2 such that the operation member 200 can move upward and downward. Moreover, the engaged part 22 on the upper part of the operation member 200 is engaged by the engaging part 26 provided inside the case 1, 2. As a result, it is possible to prevent the operation member 200 from unpreparedly moving upwards and downwards.

The opening part 56 of the case 1, 2 is formed such that the opening part 56 has a greater length upwards and downwards than the knob member 21 of the operation member 200. Accordingly, the operation member 200 can reciprocate upwards and downwards between the side of the pulled-out opening 57 and the opposite side.

Ordinarily, the operation member 200 is positioned at the upper edge of the opening part 56 as shown in FIG. 4A. That is, the operation member 200 is positioned in the most distant position from the pulled-out opening 57 for the measuring tape 6.

A tape receiving parts 33 is disposed in the vicinity of the pulled-out opening 57 with projecting form, receives the back side surface of the measuring tape 6 when the operation member 200 moves so that the braking piece 32 contacts with one side surface of the measuring tape 6.

In this embodiment, as is apparent from the above description, braking force can be applied to the take-up drum 51 regardless of the direction of the case 1, 2 by pressing the operation member 200 in the same manner as in the tape measure 50 of the embodiment shown in FIG. 1A. In addition, by moving the operation member 200 toward the pulled-out opening 57, the pulled-out measuring tape 6 can be fixed, and the length of the pulled-out measuring tape 6 can be held.

Accordingly, since the method of applying braking force to the take-up drum 51 is similar to the method described in the embodiment shown in FIG. 1A, a description of such braking force application will be omitted here, and fixing of the measuring tape 6 will be described with reference to FIGS. 4A, 4B, 4C and 6.

When the measuring tape 6 is to be fixed in a pulled-out state, the knob member 21 of the operation member 200 is pressed into the case 1, 2 so that the operation member 200 is caused to flex toward the inside of the case 1, 2, thus releasing the engaged part 22 from the engaging part 26. Then, knob member 21 is pushed downward and toward the lower part of the opening part 56. When the knob member 21 is pushed downward, the operation member 200 slides downward along the outer circumferential parts of the take-up drum 51 with the flange part 25 of the operation member 200 guided by the flange guide part 27. When the operation member 200 moves downward, the braking piece 32 disposed on the lower end part of the operation member 200 contacts with the front surface of the measuring tape 6 extending toward the pulled-out opening 57 from the take-up drum 51, and applies braking force (here, as the front surface designates the surface that faces the inside of the take-up drum 51 when the measuring tape 6 is taken up by the take-up drum 51, and the back surface designates the surface that faces in the outside direction of the take-up drum). When the operation member 200 is pushed further downward, the braking piece 32 on the lower end of the operation member 200 slides along the front surface of the measuring tape 6 and moves toward the take-up drum 51 with the operation member 200 flexed toward the inside of the case 1, 2, and when the knob member 21 is pushed downward as far as the lower end of the opening part 56, the braking piece 32 strongly presses the measuring tape 6 against the tape receiving parts 33. As a result, the measuring tape 6 is firmly caught (sandwiched) between the braking piece 32 and tape receiving parts 33, and thus is fixed.

When the knob member 21 is positioned at the lower edge of the opening part 56, the operation member 200 is held in a state in which the operation member 200 is flexed into the inside of the case 1, 2. Accordingly, the braking piece 32 strongly presses the measuring tape 6 against the tape receiving parts 33 that receives the back surface of the measuring tape 6 by the force by which the operation member 200 tries to return to its original shape (i. e., the force which causes the braking piece 32 of the lower end of the operation member 200 to move toward the outside of the case 1, 2), so that the measuring tape 6 is fixed.

Meanwhile, when the operation member 200 moves downward, the engagement parts 31 disposed on the flange part 25 move downward. When the operation member 200 moves downward and up to the position where the measuring tape 6 is fixed, the engagement parts 31 emerge downward from the ditch 28 of the flange guide part 27, and are positioned below the flange guide part 27. As a result, the engagement parts 31 engage a holding part 27a on the end part of the flange guide part 27 shown in FIG. 4C, and thus are held, so that the operation member 200 is held at the position (i. e., the lower-end position) where the measuring tape 6 is fixed. In this state, therefore, even if the finger, etc., of an operator is removed from the operation member 200, there is no inadvertent take-up of the measuring tape 6.

When the fixing of the measuring tape 6 is to be canceled, the knob member 21 is pressed upward and moved toward the upper part of the opening part 56. In other words, the knob member 21 is moved away from the pulled-out opening 57 for the measuring tape 6. By the force that causes the knob member 21 to move upward, the engagement parts 31 held by the holding part 27a of the flange guide part 27 try to climb over the holding part 27a. At this time, the flange part 25 of the operation member 200 is caused to flex and to move toward the outside of the case 1, 2 by the force applied to the contact points between the engagement parts 31 and the holding part 27a, so that the engagement parts 31 climb over the holding part 27a. When the engagement parts 31 climb over the holding part 27a, the flange part 25 returns to its original shape by its own elastic force, and the flange part 25 and engagement parts 31 are positioned inside the ditch 28.

When the knob member 21 is moved further upward, the engaged part 22 on the upper end part of the operation member 200 is led above the opening part 56 of the case 1, 2. At this time, the operation member 200 flexes toward the inside of the case 1, 2 with the engagement parts 31 inside the ditch 28 acting as supporting points, so that engaged part 22 of the operation member 200 is pushed toward the inside of the case 1, 2 above the opening part 56. When the knob member 21 is then moved still further upward, the flange part 25 of the operation member 200 moves upward by being guided by the flange guide part 27, so that the tapered surface 25a formed on the upper end part of the flange 25 contacts with the projecting part 55 formed on the upper end part of the flange guide part 27. At this moment, since the upper end part of the flange part 25 is formed with a tapered shape, the flange part 25 can move smoothly upward without being caught by the projecting part 55 of the flange guide part 27.

When the tapered surface 25a of the flange part 25 contacts with the projecting part 55 of the flange guide part 27, the operation member 200 flexes toward the inside of the case 1, 2 with the contact part between the flange part 25 and the projecting part 55 acting as a supporting part, so that the engaged part 22 on the upper end part of the operation member 200 is pushed into the inside of the case 1, 2.

When the knob member 21 is moved to the upper edge of the opening part 56, the upper part of the flange part 25 of the operation member 200 is caught, inside the ditch 28, between the projecting part 55 of the flange guide part 27 and a flange of the case 1, 2. Furthermore, the engagement parts 31 of the flange part 25 are also similarly caught inside the ditch 28, so that the inclination of the operation member 200 is eliminated. As a result, the operation member 200 is pushed into the inside of the case 1, 2 only by the flexing of the case 1, 2.

When the force by a worker which is pushing the knob member 21 is removed, the operation member 200 undergoes elastic recovery, so that the engaged part 22 on the upper part of the operation member 200 moves toward the outside of the case 1, 2. Thereby, the engaged part 22 is engaged by the engaging part 26 disposed inside the case 1, 2, thus leading to the state shown in FIG. 4A.

In this embodiment, since the operation member 200 can be held in a position where the measuring tape 6 is fixed, a worker can remove his fingers, etc., from the operation member 200 and perform measurement work with the length of the pulled-out measuring tape 6 maintained. Accordingly, it is easy to carry out measuring.

In the present embodiment, it is assumed that the brake shoe 23 and the braking piece 32 are formed as integral parts of the operation member 200, but the brake shoe 23 and the braking piece 32 may be formed as separate parts and installed on the case.

Means for holding the operation member 200 is described as the engagement parts 31. However, if an effect of holding the operation member 200 in the lower position can be obtained, it is sufficient. Therefore, the means for holding the operation member 200 is not limited to the means described hereinabove.

The braking piece may designate the combination of the braking piece 32 and the flange part 25.

What is claimed is:

1. A tape measure comprising:
   a take-up drum supported by supporting shafts disposed inside a case such that the take-up drum is free to rotate, and around whose circumference a measuring tape is wound;
   a take-up spring for supplying impetus that causes the take-up drum to rotate in the direction of retracting the measuring tape;

bearings which are formed on the take-up drum, have inner diameters that are larger than the outer diameters of the supporting shafts, and enable the take-up drum to move in the radial direction of the supporting shafts;

an operation member disposed on the case to cause the take-up drum to move in the radial direction of the supporting shafts, and thereby force the take-up drum to move in one direction of the inside wall of the case; and braking members disposed on the inside wall of the case for applying braking force to the rotation of the take-up drum by the contact between the braking members and outer circumferential parts of the take-up drum when the take-up drum is moved by the operation member.

2. The tape measure according to claim 1, wherein said operation member is disposed on the side wall of said case demarcating the outer circumferential parts of said take-up drum.

3. The tape measure according to claim 2, wherein said braking members are disposed on the inside wall of the case, and are situated on the opposite side of said operation member.

4. The tape measure according to claim 3, wherein the front surfaces of said braking members have curved surfaces that generally conform to the outer circumferential parts of said take-up drum.

5. The tape measure according to claim 1, wherein said operation member includes:

a knob member situated on the side wall of said case that demarcates the outer circumferential parts of said take-up drum such that this knob member is free to perform a reciprocating motion to and from the inside of the case; and a brake shoe which is disposed on said knob member, is situated inside said case, contacts with the outer circumferential parts of said take-up drum so as to move said take-up drum toward the opposite side of said operation member, and applies braking force to the rotation of said take-up drum.

6. The tape measure according to claim 1, wherein said operation member is made from synthetic resin.

7. The tape measure according to claim 1, wherein said operation member is made from polyacetal.

8. The tape measure according to claim 1, wherein the cross-sectional shapes of said supporting shafts are non-circular.

9. The tape measure according to claim 1, wherein the cross-sectional shapes of said supporting shafts are substantially elliptical.

10. The tape measure according to claim 1, wherein said case and said braking members are made from ABS resin.

11. A tape measure comprising:

a take-up drum supported by supporting shafts disposed inside a case such that said take-up drum is free to rotate, and around whose circumference a measuring tape is wound;

a take-up spring for supplying impetus that causes the take-up drum to rotate in the direction of retracting the measuring tape;

first means located on said take-up drum for enabling the take-up drum to move in the radial direction of the supporting shafts;

second means located on the case for causing said take-up drum to move in the radial direction of the supporting shafts, and thereby forcing the take-up drum to move in one direction of the inside wall of the case; and third means located on the inside wall of the case for applying braking force to the rotation of the take-up drum by the contact between the third means and outer circumferential parts of the take-up drum when the take-up drum is moved by the second means.

12. The tape measure according to claim 11, wherein the second means is installed on the side wall of said case demarcating the outer circumferential parts of said take-up drum.

13. The tape measure according to claim 12, wherein the third means is disposed on the inside wall of the case, and situated on the opposite side of the second means.

14. The tape measure according to claim 13, wherein the front surface of the third means has curved surface that generally conforms to the outer circumferential parts of said take-up drum.

15. A tape measure comprising:

a take-up drum supported by supporting shafts disposed inside a case such that said take-up drum is free to rotate, and around whose circumference a measuring tape is wound;

a take-up spring for supplying impetus that causes the take-up drum to rotate in the direction of retracting the measuring tape;

bearings which are disposed on said take-up drum, have diameters larger than the diameters of said supporting shafts, and enable the take-up drum to move in the radial direction of the supporting shafts;

an operation member disposed on the case to cause the take-up drum to move in the radial direction of the supporting shafts, and thereby force the take-up drum to move in one direction of the inside wall of the case;

braking members disposed on the inside wall of the case to apply braking force to the rotation of the take-up drum by the contact between said braking members and outer circumferential parts of the take-up drum when the take-up drum is moved by the operation member; and tape lock means situated in said case for applying braking force to the measuring tape pulled out of said take-up drum to the outside of said case against the impetus of the take-up spring so as to maintain the length of the pulled-out measuring tape, and for fixing the measuring tape.

16. The tape measure according to claim 15, wherein the tape lock means includes:

a brake piece to contact with the measuring tape pulled out of said take-up drum, and thereby apply braking force to the measuring tape; and hold means for holding said braking piece in a place where the braking piece (32) fixes the measuring tape.

17. The tape measure according to claim 15, wherein the operation means is installed on the side wall of said case demarcating the outer circumferential parts of said take-up drum.

18. The tape measure according to claim 17, wherein the operation means is installed such that the operation means can move along the outer circumferential parts of said take-up drum.

19. The tape measure according to claim 15, wherein said operation means is installed in close proximity to an opening out of which the measuring tape is pulled.

20. The tape measure according to claim 15, wherein the operation member includes:

a knob member disposed on the side wall of said case that demarcates the outer circumferential parts of said take-up drum such that this knob member is free to perform a reciprocating motion to and from the inside of the case;

a brake shoe which is disposed on said knob member, is situated inside said case, contacts with the outer circumferential parts of said take-up drum so as to move said take-up drum toward the opposite side of said operation member, and applies braking force to the rotation of said take-up drum;

a braking piece to contact with one side surface of said pulled-out measuring tape, and thereby apply braking force when said knob member is made to move, along the outer circumferential parts of said take-up drum, toward an opening out of which the measuring tape is pulled; and hold means for holding said knob member in a place where said braking piece contacts with the one side surface of said measuring tape and thereby applies braking force.

21. The tape measure according to claim 20, wherein said braking piece is formed integrally on the closer part of said knob member to the opening for the measuring tape.

22. The tape measure according to claim 20, wherein said brake shoe is formed integrally on the more distant part of said knob member from the opening for the measuring tape.

23. The tape measure according to claim 20, wherein said hold means includes:

engagement parts disposed on said braking piece; and a holding part disposed on said case to hold said engagement parts.

24. The tape measure according to claim 23, wherein said engagement parts are formed on the side of said braking piece that faces said take-up drum, and said holding part is disposed on said case so as to be positioned between said take-up drum and said braking piece.

25. The tape measure according to claim 20, wherein said braking piece is made from synthetic resin that possesses flexibility.

26. The tape measure according to claim 24 further including a tape receiving part disposed, near the pulled-out opening, inside the case for receiving the one side of the measuring tape when the braking piece pushes the other side of the measuring tape, wherein the measuring tape is caught between the braking piece and the tape receiving part, and fixed by elastic force of the operation member.

27. The tape measure according to claim 20, wherein said braking piece is formed with a curved shape that generally conforms to said take-up drum.

28. A tape measure comprising:

a take-up drum supported by supporting shafts disposed inside a case such that said take-up drum is free to rotate, and around whose circumference a measuring tape is wound;

a take-up spring for supplying impetus that causes the take-up drum to rotate in the direction of retracting the measuring tape;

first means located on the take-up drum for enabling the take-up drum to move in the radial direction of the supporting shafts;

second means located on the case for causing the take-up drum to move in the radial direction of the supporting shafts and thereby forcing the take-up drum to move in one direction of the inside wall of the case;

third means located on the inside wall of the case for applying braking force to the rotation of the take-up drum by the contact between the third means and outer circumferential parts of the take-up drum when the take-up drum is moved by the second means; and fourth means situated in said case for applying braking force to the measuring tape pulled out of said take-up drum to the outside of said case against the impetus of the take-up spring so as to maintain the length of the pulled-out measuring tape, and for fixing the measuring tape.

29. The tape measure according to claim 28, wherein the fourth means includes:

fifth means for applying braking force to the measuring tape by the contact between the fifth means and the measuring tape pulled out of said take-up drum, and for fixing the pulled-out measuring tape; and sixth means for holding said fifth means in a place where the fifth means fixes the measuring tape.

30. The tape measure according to claim 28, wherein the second means includes:

seventh means located on the side wall of said case that demarcates the outer circumferential parts of said take-up drum such that the seventh means is free to perform a reciprocating motion to and from the inside of the case;

eighth means located on said seventh means and inside said case for pushing said take-up drum toward the opposite side of the second means, and for applying braking force to the rotation of said take-up drum by the contact between the eight means and the outer circumferential parts of said take-up drum;

fifth means for applying braking force to the measuring tape by the contact between the fifth means and the one side surface of said pulled-out measuring tape when said seventh means are moved toward the opening for the measuring tape along the outer circumferential parts of said take-up drum; and sixth means for holding said seventh means in a place where said sixth means contacts with the one side surface of said measuring tape and applies braking force to the measuring tape.

31. A method for providing a tape measure which includes a take-up drum which is supported by supporting shafts disposed inside a case such that the take-up drum is free to rotate, and around whose circumference a measuring tape is wound, and a take-up spring which supplies impetus causing the take-up drum to rotate in the direction of retracting the measuring tape, comprising the steps of:

providing first means located on said take-up drum and having an inner diameter larger than the outer diameter of said supporting shafts for enabling said take-up drum to move in the radial direction of said supporting shafts;

providing second means located on said case for moving said take-up drum in the radial direction of said supporting shafts so as to move in the one direction of the inside wall of said case; and providing third means located on the inside walls of said case for applying braking force to the rotation of said take-up drum by the contact between the third means and outer circumferential parts of said take-up drum when said take-up drum is moved by the second means.

32. The method according to claim 30, further including the step of providing fourth means located in said case for applying braking force to the measuring tape pulled out of said take-up drum to the outside of said case against the impetus of the take-up spring so as to maintain the length of the pulled-out measuring tape, and for fixing the measuring tape.

33. For use with a tape measure including a case, a take-up drum installed in the case around whose circumference a measuring tape is wound, a braking member, and an operation member causing the take-up drum to be pushed toward the braking member, a method of applying braking force to the rotation of the take-up drum comprising the steps of:

(A) pushing the operation member in order to make the operation member contact with the take-up drum, and apply braking force to the rotation of the take-up drum by the contact between the operation member and the take-up drum; and (B) pushing the operation member more strongly in order to make the take-up drum move toward the braking member, thereby make the take-up drum contact with the braking member, and apply greater braking force to the rotation of the take-up drum by catching the take-up drum between the operation member and the braking member, whereby regardless of the direction of the case, it is possible to slow the rotation speed of the take-up drum at will, and also possible to stop the rotation of the take-up drum.

* * * * *